(12) United States Patent
Mizuno et al.

(10) Patent No.: US 11,481,697 B2
(45) Date of Patent: Oct. 25, 2022

(54) VEHICLE DISPATCH SYSTEM, SERVER, AND INFORMATION PROCESSING METHOD

(71) Applicant: TOYOTA JIDOSHA KABUSHIKI KAISHA, Toyota (JP)

(72) Inventors: Yuko Mizuno, Nagoya (JP); Shin Sakurada, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 337 days.

(21) Appl. No.: 16/592,969

(22) Filed: Oct. 4, 2019

(65) Prior Publication Data
US 2020/0143296 A1  May 7, 2020

(30) Foreign Application Priority Data

Nov. 1, 2018  (JP) .............................. JP2018-206808

(51) Int. Cl.
*G06Q 10/02* (2012.01)
*G08G 1/00* (2006.01)
(Continued)

(52) U.S. Cl.
CPC .............. *G06Q 10/02* (2013.01); *G06Q 50/30* (2013.01); *G08G 1/123* (2013.01); *G08G 1/202* (2013.01); *H04W 4/40* (2018.02)

(58) Field of Classification Search
CPC ........ G06Q 10/02; G06Q 50/30; G08G 1/123; G08G 1/202; H04W 4/40
See application file for complete search history.

(56) References Cited

U.S. PATENT DOCUMENTS

| | | | |
|---|---|---|---|
| 2002/0090913 A1* | 7/2002 | Ritter ................... | H04B 1/3816 455/411 |
| 2017/0039488 A1* | 2/2017 | Lin ........................ | G06Q 50/30 |

(Continued)

FOREIGN PATENT DOCUMENTS

| | | |
|---|---|---|
| JP | 2007-34823 A | 2/2007 |
| JP | 2008-191958 A | 8/2008 |

OTHER PUBLICATIONS

Adnan, Muhammad, et al. "Evaluating disruption management strategies in rail transit using SimMobility mid-term simulator: A study of Singapore MRT North-East line." Proceedings of the 96th Annual Meeting of the Transportation Research Board, Washington, DC, USA. 2017. (Year: 2017).*

*Primary Examiner* — Resha Desai
*Assistant Examiner* — Carter P Brockman
(74) *Attorney, Agent, or Firm* — Oblon, McClelland, Maier & Neustadt, L.L.P.

(57) ABSTRACT

A vehicle dispatch system includes an information processing device provided in a public transport, a server configured to manage a service for dispatching a vehicle, and driver terminals configured to be browsed and operated by drivers of a plurality of registered vehicles. The server is configured to receive a second request including the number of transportation requesters of a plurality of sections respectively connecting second positions as departure places and destinations from the information processing device. The server is configured to decide candidates of a plurality of vehicles to be dispatched to any of the second positions based on the number of transportation requesters of each section and transmits second vehicle dispatch request information including positional information of any of the second positions and the number of boarding requesters and not including identification information of a specific user to the vehicles.

7 Claims, 6 Drawing Sheets

(51) Int. Cl.
*H04W 4/40* (2018.01)
*G06Q 50/30* (2012.01)
*G08G 1/123* (2006.01)

(56) References Cited

U.S. PATENT DOCUMENTS

2019/0171207 A1* 6/2019 Hanson .................. B60R 25/24
2019/0204110 A1* 7/2019 Dubielzyk .......... G01C 21/3423
2019/0339087 A1* 11/2019 Jindal .................. G06N 3/0454

* cited by examiner

FIG. 5

| | | DESTINATION | | | |
|---|---|---|---|---|---|
| | | B STATION | C STATION | D STATION | E STATION |
| DEPARTURE PLACE | B STATION | | 150 | 50 | 300 |
| | C STATION | ... | | ... | ... |
| | D STATION | ... | ... | | ... |
| | E STATION | ... | ... | ... | |

FIG. 6

| | | DESTINATION | |
|---|---|---|---|
| | | FOR B STATION | FOR E STATION |
| DEPARTURE PLACE | B STATION | | 500 |
| | C STATION | ... | ... |
| | D STATION | ... | ... |
| | E STATION | ... | |

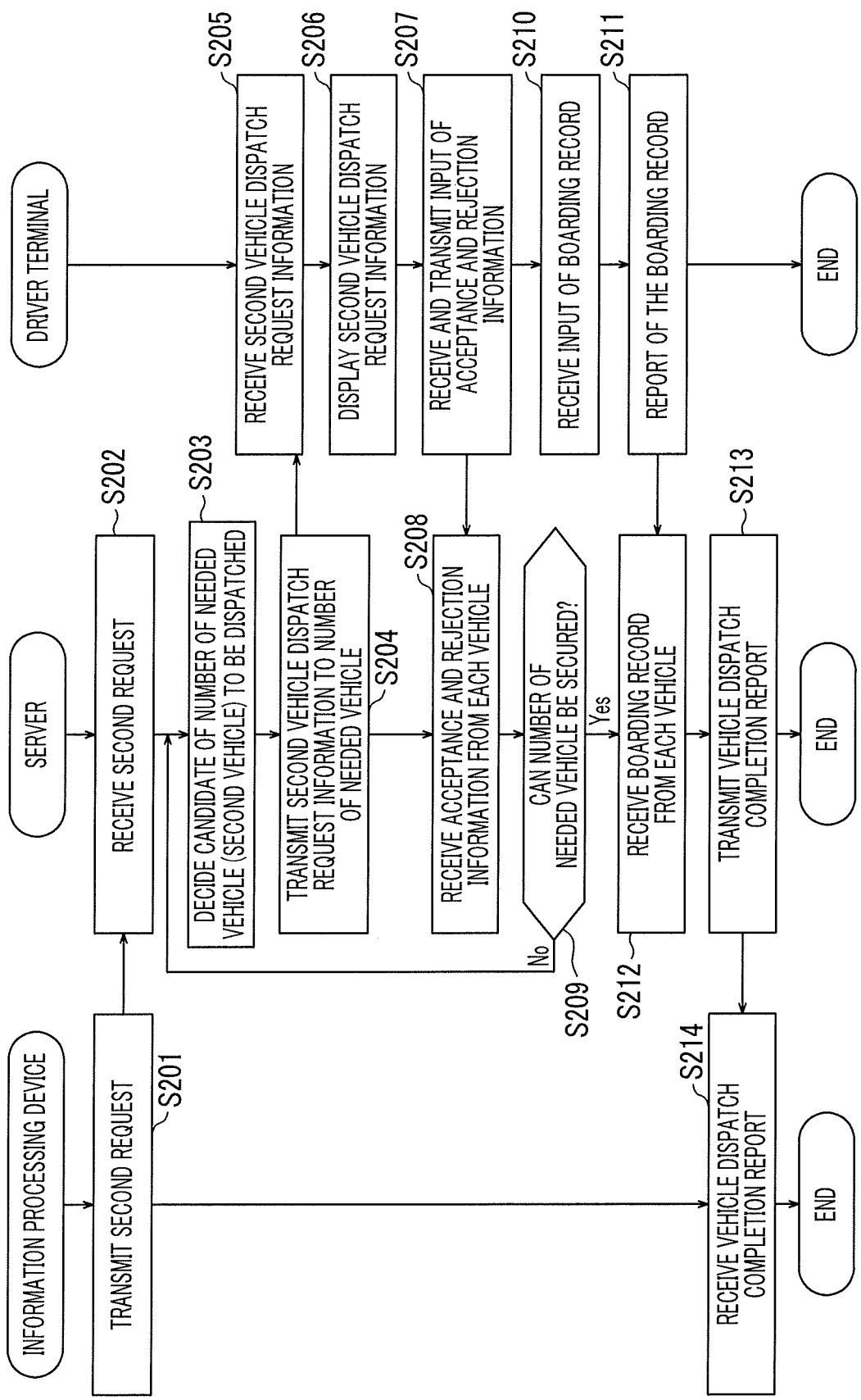

VEHICLE DISPATCH SYSTEM, SERVER, AND INFORMATION PROCESSING METHOD

INCORPORATION BY REFERENCE

The disclosure of Japanese Patent Application No. 2018-206808 filed on Nov. 1, 2018 including the specification, drawings and abstract is incorporated herein by reference in its entirety.

BACKGROUND

1. Technical Field

The present disclosure relates to a vehicle dispatch system, a server, and an information processing method.

2. Description of Related Art

In the related art, a system that presents transfer information of a train to a user at a station when public transport, such as a railroad, is non-operable is known (for example, see Japanese Unexamined Patent Application Publication No. 2008-191958 (JP 2008-191958 A)). Furthermore, a system that transmits transfer certificate information for permitting transfer transportation from a regular boarding section to a transfer boarding section to a portable terminal of a user in the same situation is known (for example, see Japanese Unexamined Patent Application Publication No. 2007-34823 (JP 2007-34823 A)).

SUMMARY

In the related art, it is assumed that there is another public transport that the user is transferrable from the non-operable public transport. However, in a case where there is no public transport that substitutes for the non-operable public transport or even though there is a substitute public transport, in a case where the substitute public transport does not have a sufficient transportation capacity, the user is forced to stay in a station or a non-operable train for a long time. Accordingly, there is room for improvement on a technique for quickly transporting the user to a destination when public transport is non-operable.

The disclosure provides a vehicle dispatch system, a server, and an information processing method capable of enabling transportation of a user to a destination when public transport is non-operable.

A first aspect of the present disclosure relates to a vehicle dispatch system. The vehicle dispatch system includes an information processing device, a server, and a plurality of driver terminals. The information processing device is provided in a public transport. The server is configured to manage a service for dispatching a vehicle. The driver terminals are configured to be browsed and operated by respective drivers of a plurality of registered vehicles. The server is configured to receive a first request from a user terminal of a user who desires to board the vehicle and a second request from the information processing device. The first request includes positional information of a first position where the user desires boarding and identification information of the user. The second request includes the number of transportation requesters of a plurality of sections respectively connecting second positions as departure places and destinations. The server is configured to, when the first request is received from the user terminal, decide candidates of one or more first vehicles to be dispatched to the first position from among the registered vehicles and transmit first vehicle dispatch request information including the positional information of the first position and the identification information to the driver terminals of the decided candidates of the first vehicles. The server is configured to, when the second request is received from the information processing device, decide candidates of a plurality of second vehicles each to be dispatched to any of the second positions from among the registered vehicles and the number of boarding requesters of each of the candidates of the second vehicles based on the number of transportation requesters of each section and transmit second vehicle dispatch request information including positional information of any of the second positions and the number of boarding requesters and not including identification information of a specific user to the driver terminals of the decided candidates of the second vehicles.

A second aspect of the present disclosure relates to a server that manages a service for dispatching a vehicle and performs communication with an information processing device provided in a public transport and a plurality of driver terminals configured to be browsed and operated by respective drivers of a plurality of registered vehicles. The server includes a transceiver and a processor. The transceiver is configured to receive a first request from a user terminal of a user who desires to board the vehicle and a second request from the information processing device. The first request includes positional information of a first position where the user desires boarding and identification information of the user. The second request includes the number of transportation requesters of a plurality of sections respectively connecting second positions as departure places and destinations. The processor is configured to, when the first request is received from the user terminal, decide candidates of one or more first vehicles to be dispatched to the first position from among the registered vehicles and generate first vehicle dispatch request information including the positional information of the first position and the identification information. The processor is configured to, when the second request is received from the information processing device, decide candidates of a plurality of second vehicles each to be dispatched to any of the second positions from among the registered vehicles and the number of boarding requesters of each of the candidates of the second vehicles based on the number of transportation requesters of each section and generate second vehicle dispatch request information including positional information of any of the second positions and the number of boarding requesters and not including identification information of a specific user. The transceiver is configured to, when the processor generates the first vehicle dispatch request information, transmit the first vehicle dispatch request information to the driver terminals of the candidates of the first vehicles, and when the processor generates the second vehicle dispatch request information, transmit the second vehicle dispatch request information to the driver terminals of the candidates of the second vehicles.

A third aspect of the present disclosure relates to an information processing method for a server of a vehicle dispatch system. The vehicle dispatch system includes an information processing device provided in a public transport, the server configured to manage a service for dispatching a vehicle, and a plurality of driver terminals configured to be browsed and operated by respective drivers of a plurality of registered vehicles. The information processing method includes receiving a first request from a user terminal of a user who desires to board the vehicle and a second request from the information processing device, the first request including positional information of a first position where the user desires boarding and identification information of the user, and the second request including the number of transportation requesters of a plurality of sections respectively connecting second positions as departure places and destinations, when the first request is received from the user terminal, deciding candidates of one or more first vehicles to be dispatched to the first position from among the registered vehicles and transmitting first vehicle dispatch request information including the positional information of the first position and the identification information to the driver terminals of the decided candidates of the first vehicles, and when the second request is received from the information processing device, deciding candidates of a plurality of second vehicles each to be dispatched to any of the second positions from among the registered vehicles and the number of boarding requesters of each of the candidates of the second vehicles based on the number of transportation requesters of each section and transmitting second vehicle dispatch request information including positional information of any of the second positions and the number of boarding requesters and not including identification information of a specific user to the driver terminals of the decided candidates of the second vehicles.

With the vehicle dispatch system, the server, and the information processing method according to the aspects of the disclosure, it is possible to quickly transport a user of public transport to a destination when the public transport is non-operable.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram showing an example of a table indicating the number of transportation requesters of each section of public transport;

FIG. 6 is a diagram showing another example of a table indicating the number of transportation requesters of each section of public transport; and FIG. 7 is a flowchart showing processing when the server receives a second request.

DETAILED DESCRIPTION OF EMBODIMENTS

Figure 1:
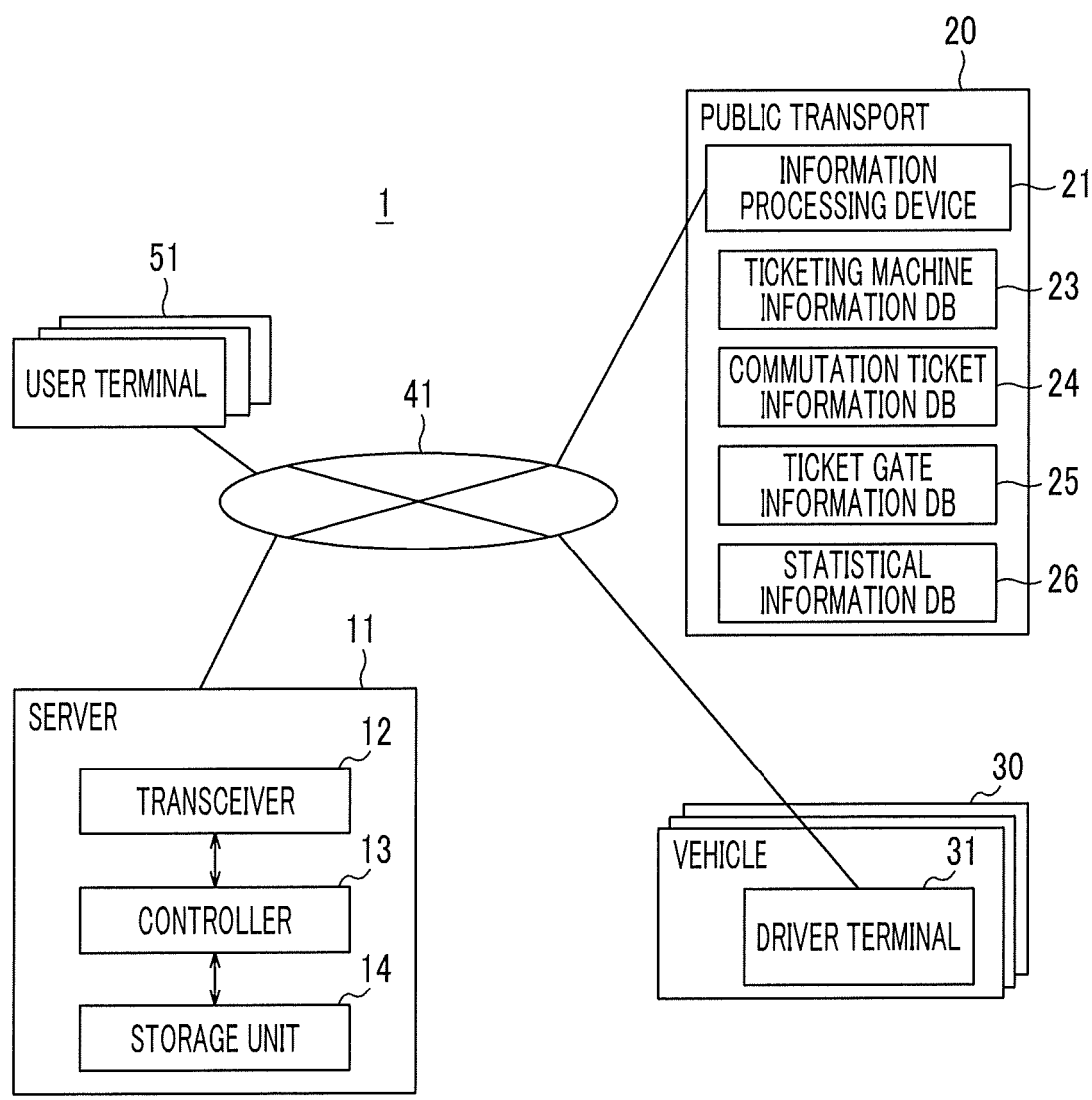
FIG. 1 is a block diagram showing the schematic configuration of a vehicle dispatch system according to an embodiment of the disclosure.

Hereinafter, an embodiment of the present disclosure will be described referring to the drawings.

The outline of a vehicle dispatch system 1 according to the embodiment of the disclosure will be described referring to FIG. 1. The vehicle dispatch system 1 includes a server 11 that manages a service for dispatching a vehicle 30, an information processing device 21 that is provided in a public transport 20, and a plurality of driver terminals 31 that is browsed and operated by drivers of a plurality of registered vehicles 30. The server 11, the information processing device 21, and the vehicles 30 are communicable through a network 41. The server 11 is connectable to a user terminal 51 of a user who desires to board the vehicle 30, through the network 41.

For the user who desires to board the vehicle 30, the vehicle dispatch system 1 dispatches the vehicle 30 to be boarded by the user to a place desired by the user. The vehicle dispatch system 1 receives a transportation request from the non-operable public transport 20 and dispatches the vehicle 30 for substituting transportation to a base of the public transport 20, such as a station. The vehicle 30 includes both of a commercial vehicle, such as a taxi, of a service provider that performs transportation as business and a general vehicle that is possessed by an individual. In the former case, a service that is provided by the vehicle dispatch system 1 includes mediation for allowing a plurality of users who goes toward destinations in the same direction to use one taxi through ride-sharing. In the latter case, a service that is provided by the vehicle dispatch system 1 includes a request to an individual who goes to a specific destination for ride-sharing. That is, the service that is provided by the vehicle dispatch system 1 includes mediation of so-called ride sharing. Hereinafter, the components of the vehicle dispatch system 1 will be described.

Server

As shown in FIG. 1, the server 11 includes a transceiver 12, a controller 13, and a storage unit 14.

The transceiver 12 can perform transmission and reception of information to and from the information processing device 21, the driver terminal 31, and the user terminal 51 through the network 41 in a wired or wireless manner. The transceiver 12 includes a communicator compatible with the network 41. In a case where the transceiver 12 is connected to the network 41 in a wired manner, the transceiver 12 may include a communicator, such as an optical network unit (ONU), a digital service unit (DSU), or a cable modem. In a case where the transceiver 12 is connected to the network 41 in a wireless manner, the transceiver 12 may include a wireless communicator and an antenna. The transceiver 12 performs processing, such as protocol processing related to transmission and reception of information, modulation of a transmission signal, and demodulation of a received signal.

The controller 13 includes single or a plurality of processors and a memory. The controller 13 controls the operation of the whole server 11. The processor includes a general-purpose processor that executes a programmed function by reading a specific program and a dedicated processor specialized for specific processing. The memory can store the program that is executed by the processor, information that is being computed in the processor, and the like. The memory and the processor are connected by a bus line of a data bus, a control bus, and the like.

The controller 13 receives requests from the information processing device 21 and the user terminal 51 and executes processing for deciding the vehicle 30 to be dispatched. The controller 13 may execute processing for calculating compensation to the driver of the vehicle 30 accompanied with the dispatch of the vehicle 30. Details of the processing that is executed by the controller 13 will be described below.

The storage unit 14 includes a semiconductor storage device, a magnetic storage device, or an optical storage device. The semiconductor storage device includes a solid state drive (SSD) using a flash memory, or the like. The magnetic storage device includes a magnetic tape, a Floppy (Registered Trademark) disk, a hard disk, or the like, and a drive device thereof. The optical storage device includes, for example, a compact disc (CD), a digital versatile disc (DVD), a Blu-ray (Registered Trademark) disc, or the like, and a drive device thereof.

The storage unit 14 stores a current position of the registered vehicle 30, a destination in a case where the vehicle 30 is traveling, a predicted traveling route, the number of transportable people, and identification information (vehicle identification information) of the vehicle 30, such as a driver name, a vehicle type, a color, and a number. The vehicle identification information of the vehicle 30 may include identification information of the driver terminal 31. In a case where the vehicle 30 is a general vehicle that is possessed by an individual, the storage unit 14 may further store conditions for boarding (for example, solely the same sex, no child permitted, no pet permitted, and no large luggage permitted) or the like. Information regarding the current position, the destination, the predicted traveling route, and the like of the vehicle 30 may be acquired from the driver terminal 31 at regular intervals. In order to acquire such information, the driver terminal 31 may cooperate with another system in the vehicle 30, for example, a navigation system. The storage unit 14 may further store previous dispatch records of each vehicle 30, evaluation information of the user, and the like.

User Terminal

For the user terminal 51, a general-purpose information terminal may be employed. As the general-purpose information terminal, a personal computer, a portable information terminal, such as a tablet PC, or a mobile phone (smartphone) is included. In a case where the general-purpose information terminal is used, a dedicated application can be mounted in the user terminal 51.

In a case of desiring to board the vehicle 30, the user transmits a first request including positional information of a first position as a position where the user desires boarding and identification information (user identification information) of the user to the server 11 using the application mounted in the user terminal 51. In a case where the user desires boarding instantly near the current position, the first position may be the current position. In a case where the user terminal 51 has a position detection device, the application may automatically acquire positional information of the current position from the position detection device as the first position. The user identification information is information for allowing the driver of the vehicle 30 to identify the user. The user identification information can include the name of the user. The user identification information may include at least either of a physical feature of the user, such as an age, a sex, or a height, or information to be a mark, such as clothes or belongings. The user identification information may be information for identifying the user terminal 51 carried with the user. For example, the user terminal 51 and the driver terminal 31 may be configured such that the position of the user terminal 51 is displayed on a map displayed on a display device of the driver terminal 31 using the user identification information of the user terminal 51.

Public Transport

The information processing device 21 is a device that is provided in the public transport 20. The information processing device 21 includes single or a plurality of processors, a memory, and a communication interface compatible with the network 41. The information processing device 21 may be either of a large computer, a workstation, a personal computer, a tablet terminal, or other electronic apparatuses. When the public transport 20 is non-operable, the information processing device 21 can transmit the transportation request to the server 11. The transportation request includes the number of transportation requesters of a plurality of sections connecting different departure places and destinations passing through the public transport 20. Each of the departure places where transportation of the public transport 20 is needed is called a second position. A transportation request that is transmitted from the public transport 20 to the server 11 is called a second request.

The information processing device 21 may calculate the number of transportation requesters of each section based on information stored in various databases of the public transport 20. For example, the databases of the public transport 20 may include a ticketing machine information database (ticketing machine information DB) 23, a commutation ticket information database (commutation ticket information DB) 24, a ticket gate information database (ticket gate information DB) 25, and statistical information database (statistical information DB) 26 relating to the use of the public transport 20 of the user. For example, the information processing device 21 can acquire information relating to issued tickets in the public transport 20 from the ticketing machine information DB 23 and the commutation ticket information DB 24 as first information, and calculates the number of transportation requesters of each section based on the first information. Here, the tickets include tickets issued by ticketing machines and commutation tickets issued by the public transport 20. For example, the first information is the number of tickets for each destination station issued by the ticketing machines at each station of a non-operable section. The information processing device 21 estimates the number of users who cannot use the non-operable public transport 20 and are staying in a station or train based on the number of tickets related to the non-operable section. Ticket gate information of the ticket gate information DB 25 can be used to estimate whether the user of the public transport 20 who has the commutation ticket is in a station yard or boards a train.

Vehicle

The vehicle 30 in the embodiment primarily means a passenger vehicle. The vehicle 30 can include a bus and a truck. Furthermore, the vehicle 30 includes an automobile of a type realizable in the future including an autonomous driving vehicle.

Figure 2:
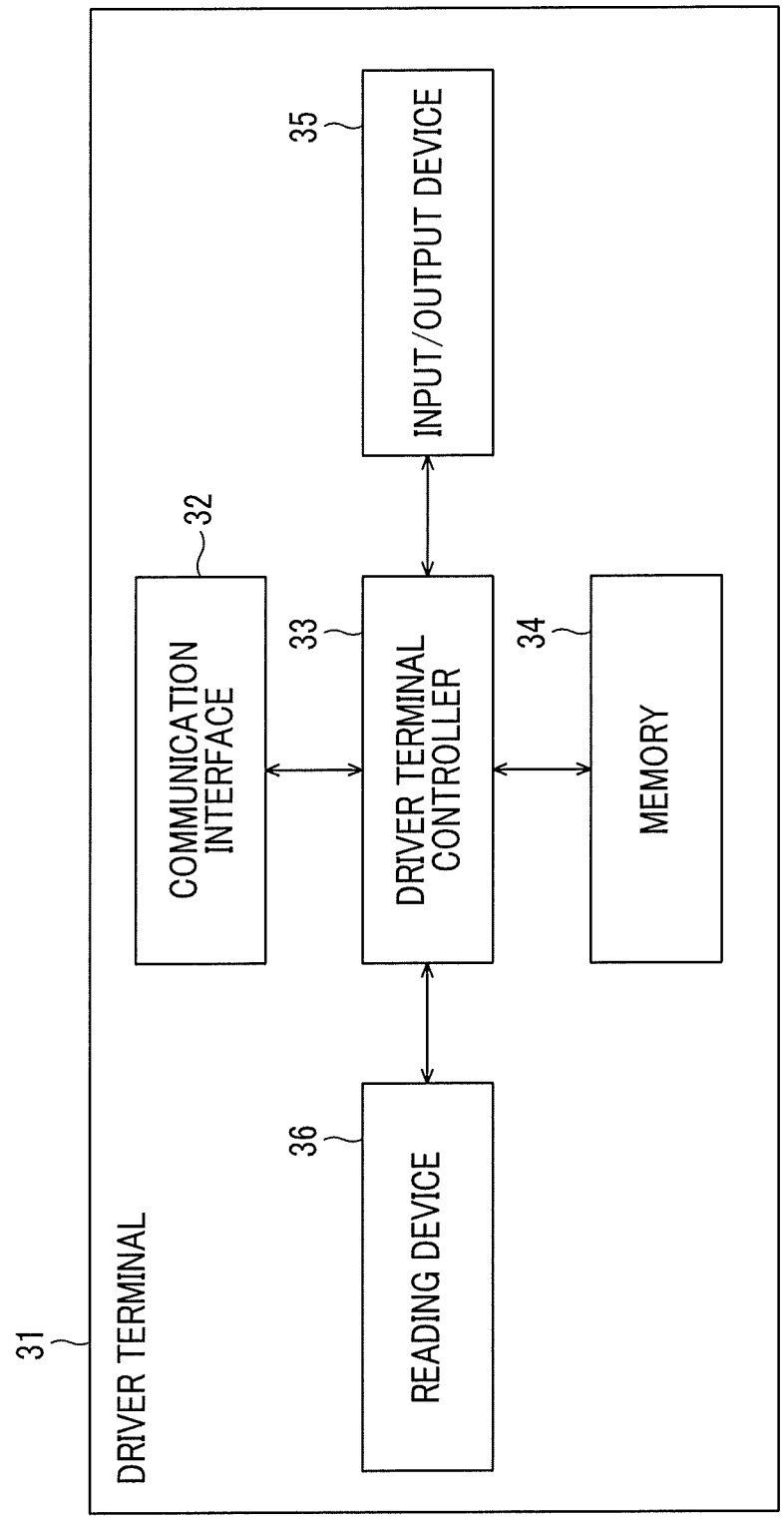
FIG. 2 is a block diagram showing the schematic configuration of a driver terminal of FIG. 1.

As shown in FIG. 2, the driver terminal 31 includes a communication interface 32, a driver terminal controller 33 including single or a plurality of processors, a memory 34, and an input/output device 35, such as a touch panel. The communication interface 32 corresponds to a communication protocol of the network 41, and is configured to transmit and receive information to and from the server 11. The driver terminal controller 33 includes single or a plurality of processors. The driver terminal controller 33 executes various kinds of information processing and controls the whole driver terminal 31. The input/output device 35 displays information to the driver and receives an input of information from the driver. The driver terminal 31 includes a terminal provided in the vehicle 30 and a portable terminal. In a case where the driver terminal 31 is a terminal provided in the vehicle 30, the units of the driver terminal 31 can share a part of the configurations of other devices in the vehicle 30.

The driver terminal 31 has a position detection device or cooperate another device in the vehicle 30 having a position detection device, thereby acquiring positional information of a current position of the vehicle 30. The position detection device can be a device that detects an absolute position (by a latitude and a longitude) of the vehicle 30. The position detection device includes, for example, a global positioning system (GPS) reception device. Information regarding the latitude and the longitude of the current position of the vehicle 30 can be obtained using a signal from the GPS reception device. A GPS measures the position of the vehicle 30 using artificial satellites. Instead of the GPS reception device or in addition to the GPS reception device, a reception device compatible with another global navigation satellite system (GNSS) may be employed. As another GNSS, for example, a satellite positioning system using a quasi-zenith satellite is included. The driver terminal 31 transmits the positional information of the vehicle 30 to the server 11 at regular intervals.

The driver terminal 31 may acquire at least either of a current destination or a predicted traveling route of the vehicle 30 from an input of the driver or a navigation device or the like in the vehicle 30. The driver terminal 31 may transmit these kinds of information to the server 11 at regular intervals or when setting is changed.

The driver terminal 31 can include a reading device 36 that reads information of a ticket of the public transport 20. The ticket of the public transport 20 can include information regarding use date and time, a station having issued the ticket, an amount of money, and the like, for example, in a case of a train ticket. The ticket of the public transport 20 can include information regarding an expiration date for use and an effective section, for example, in a case of a commutation ticket. The ticket of the public transport 20 can be read by a magnetic reading device or a short-distance wireless communicator. Information that can be read from the ticket is called second information. The second information includes, for example, information regarding effective date and time and an effective section of the ticket. For example, the reading device 36 is started with a signal from the server 11. The reading device 36 can be used to identify whether or not a user of the public transport 20 who boards the vehicle 30 is a regular user. The regular user means a user that having a ticket passing through a non-operable section of the public transport 20.

The driver terminal 31 may not have the reading device 36. In this case, the driver of the vehicle 30 may input information regarding the number of transported people and points of start and end of transportation from the touch panel of the driver terminal. In a case where the driver terminal 31 does not include the reading device 36, a general-purpose information terminal, such as a portable information terminal or a mobile phone (smartphone), can be used as the driver terminal 31. In this case, the driver can mount an application dedicated to the system in the driver terminal 31.

The driver terminal 31 accumulates information regarding the number of boarded regular users of the public transport 20 and points of start and end of transportation. The driver terminal 31 generates third information obtained by totalizing the number of people transported by the vehicle 30 and the points of start and end of transportation based on the accumulated information. The driver terminal 31 can transmit the third information to the server 11. The third information is transmitted to the server 11 for use in computation of compensation to the driver of the driver terminal 31.

Network

For the network 41, various communication networks, such as the Internet, a virtual private network (VPN), and a mobile phone line can be used. The server 11 and the information processing device 21, the server 11 and the driver terminal 31, and the server 11 and the user terminal 51 may be connected using different types of networks 41.

Processing Flow to Request from User

Figure 3:
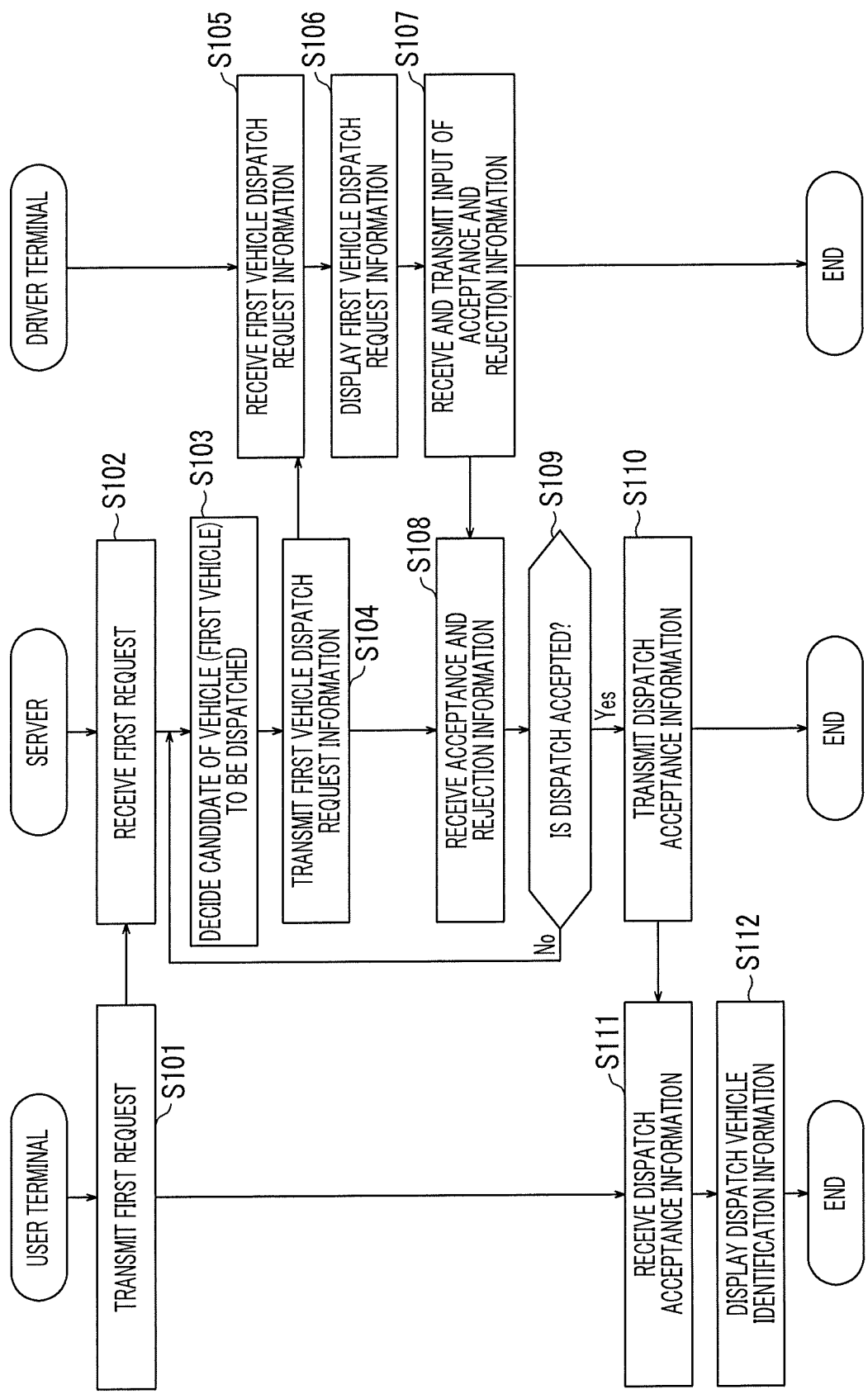
FIG. 3 is a flowchart showing processing when a server receives a first request.
Figure 4:
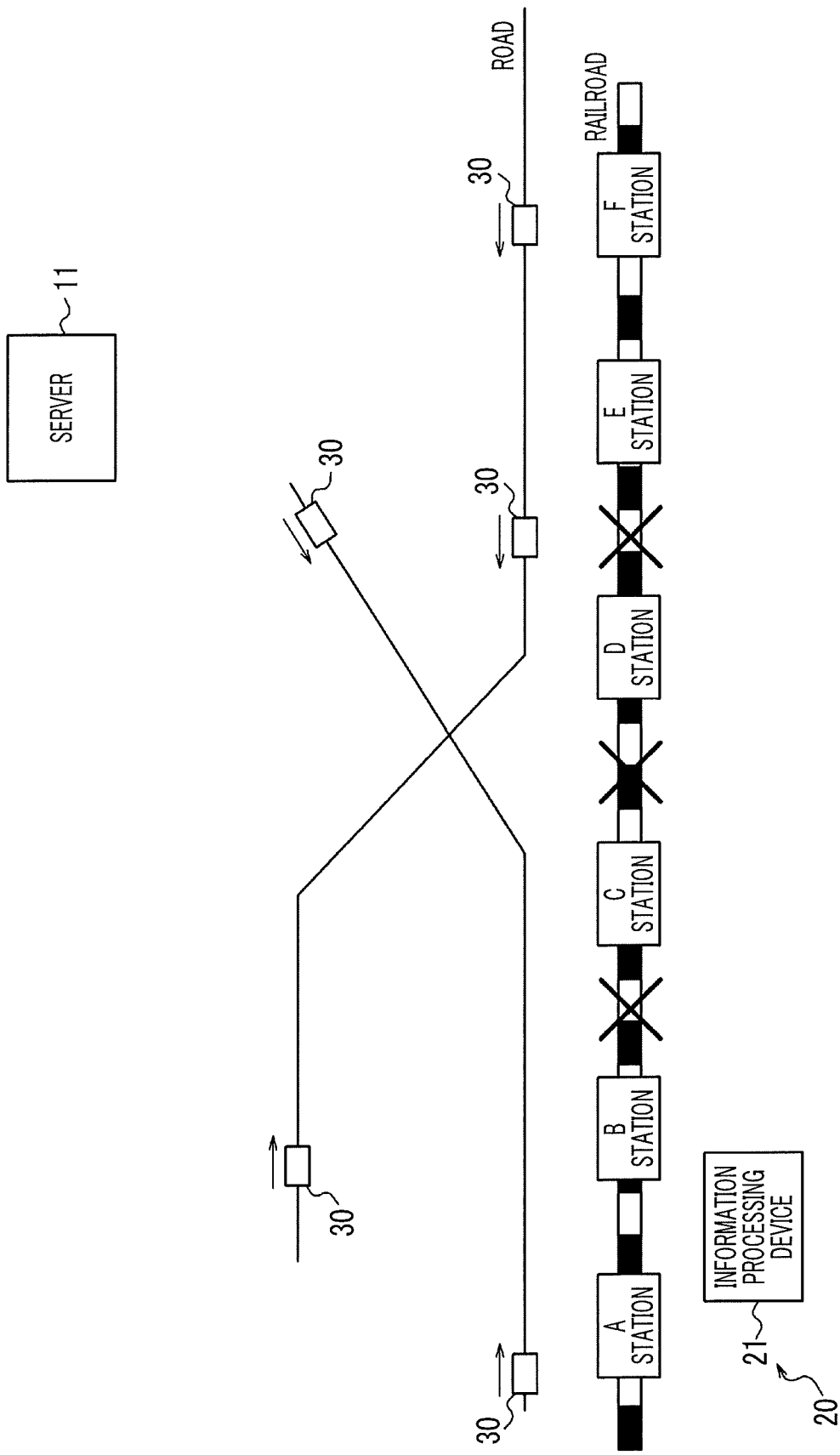
FIG. 4 is a diagram showing an example of a transportation route by a vehicle in a state in which public transport is non-operable.

A processing flow of the vehicle dispatch system in a case where the user issues a dispatch request of the vehicle 30 from the user terminal 51 will be described referring to FIG. 3. FIG. 3 includes an information processing method of server 11.

First, the user requests the dispatch of the vehicle 30 using the application on the user terminal 51. In a case of requesting the dispatch of the vehicle 30 to be boarded by the user instantly at this time, the user inputs an unboarding position (destination) on the user terminal 51 as needed. The user terminal 51 transmits the first request including the current positional information (first position) as the boarding position desired by the user, the unboarding position, and the user identification information to the server 11 through the network 41 (Step S101). In a case of making a reservation for the dispatch of the vehicle 30 in the future, not at present, the user inputs information regarding desired use date and time, the boarding position (first position), and the unboarding position, and the like to the user terminal 51. The user terminal 51 transmits the first request including these kinds of information to the server 11.

In a case where the first request is received through the transceiver 12 (Step S102), the controller 13 of the server 11 decides candidates of the vehicle 30 (first vehicle) to be dispatched to the user from among a plurality of registered vehicles 30 stored in the storage unit 14 (Step S103). The vehicle 30 to be dispatched is decided based on a current position, a destination, a predicted traveling route, and the number of transportable people of each of the registered vehicles 30, registered conditions, and the like.

The controller 13 of the server 11 transmits first vehicle dispatch request information to the driver terminal 31 of the decided vehicle 30 through the transceiver 12 (Step S104). The first vehicle dispatch request information includes positional information of the position (first position) where the user desires boarding, the positional information of the position where the user desires unboarding, and the user identification information. In Step S104, a part of the user identification information may not be included in the first vehicle dispatch request information, and after the vehicle 30 accepts the dispatch, the first vehicle dispatch request information including the remaining user identification information may be transmitted again.

In a case where first vehicle dispatch request information is received (Step S105), the driver terminal 31 displays, on the input/output device 35, such as the touch panel, the effect that the dispatch request is received, and the detail of the received first vehicle dispatch request information (Step S106).

The driver terminal 31 displays a screen for requesting the driver to answer whether to accept or reject the dispatch request of the vehicle 30. The driver terminal 31 receives an input of information (acceptance and rejection information) regarding acceptance or rejection from the driver and transmits the received information to the transceiver 12 of the server 11 (Step S107).

The controller 13 of the server 11 receives the acceptance and rejection information through the transceiver 12 (Step S108). In a case where the acceptance and rejection information received from the driver terminal 31 is the rejection of the dispatch request of the vehicle 30 (Step S109: No), the controller 13 returns the process to Step S103, and decides other candidates of the vehicle 30 (first vehicle) to be dispatched from among the registered vehicles 30. Hereinafter, the processing of Steps S103 to S109 is repeated between the server 11 and the driver terminal 31 as described above until the vehicle 30 to be dispatched is decided.

In a case where the acceptance and rejection information received from the driver terminal 31 is the acceptance of the dispatch request of the vehicle 30 (Step S109: Yes), the controller 13 transmits dispatch acceptance information to the user terminal 51 having transmitted the first request through the transceiver 12 (Step S110). The dispatch acceptance information includes the vehicle identification information of the vehicle 30, such as the driver name, the vehicle type, the color, and the number, for allowing the user to identify the vehicle 30 at a boarding location. For the vehicle identification information of the vehicle 30, information stored in the storage unit 14 can be used.

In a case where the dispatch acceptance information is received from the server 11 (Step S111), the user terminal 51 displays the effect that the dispatch of the vehicle 30 is accepted and the vehicle identification information of the vehicle 30 to be boarded by the user (Step S112). The user confirms, for example, the vehicle type, the number, and the like of the vehicle 30 displayed on the user terminal 51 at the boarding location, thereby looking for the vehicle 30 to be boarded by the user. The user terminal 51 may receive the vehicle identification information of the driver terminal 31 from the server 11 and may display the position of the vehicle 30 to be boarded by the user on a map on the application using the vehicle identification information, thereby looking for the vehicle.

The server 11 may perform solely the dispatch of the vehicle 30 as shown in the above-described procedure. It should be noted that the server 11 may have a function of mediating payment of compensation between the user and the driver.

Processing Flow to Request from Public Transport

Next, a processing flow of the vehicle dispatch system 1 in a case where the public transport 20 requests the dispatch of the vehicle 30 from the information processing device 21 to the server 11 when the public transport 20 is non-operable will be described referring to FIGS. 4 to 7. A processing flow of FIG. 7 includes the information processing method of the server 11.

First, as a premise for the use of the vehicle dispatch system 1 in the public transport 20, it is assumed that a part of sections is non-operable due to an accident, a failure, a disaster, bad weather, or the like in the public transport 20, such as a railroad. For example, in FIG. 4, it is assumed that, in a route of a railroad from an A station to an F station, a railroad from a B station to an E station is not operated. In this case, at the B station, a user of the public transport 20 who cannot go for the F station may not board the railroad and may stay in the station. Furthermore, at the E station, a user of the public transport 20 who cannot go for the A station may not board the railroad and may stay in the station. In addition, at a C station and a D station, users who go for the A station and the F station, respectively, may stay in the station.

It is assumed that there is at least one road in the vicinity of each station of the public transport. It is desirable that the users who are staying in the B station to the E station included in the non-operable section of the public transport 20 can transfer to the vehicle 30 that is parked in the vicinity or passes through a road and can go to the destinations.

To this end, first, the information processing device 21 acquires information (first information) relating to the issued tickets in the public transport and computes the number of transportation requesters of a plurality of sections with a plurality of stations from the A station to the F station as a departure place (second position) and a destination, respectively. The computation of the number of transportation requesters in the information processing device 21 may be performed with an operation of a person in charge of the public transport 20 as a starting point. The information processing device 21 estimates the number of users who cannot move between the stations included in the non-operable section and sets the estimated number of users as the number of transportation requesters. The number of transportation requesters is shown, for example, as in FIG. 5. In FIG. 5, the number of transportation requesters is calculated for each of combinations with the stations including both ends of the non-operable section as a departure place and a destination, respectively.

A calculation method of the number of transportation requesters is not limited to the form of FIG. 5. For example, in a case where a railroad track of the public transport from the B station to the E station runs in parallel with the same main road, the users who go toward the destinations in the same direction can board the same vehicle 30 and sequentially unboard at the destination stations. For example, as shown in FIG. 6, the number of users who go from each station toward each direction can be estimated and set as the number of transportation requesters. In the case shown in FIG. 6, the number of transportation requesters of the section from the B station toward the E station is calculated including the users who unboard in the middle.

A section where the public transport 20 issues a transportation request is not limited to the base of the station of the public transport 20, such as a station. For example, when a train is stopped between two stations in a railroad, the public transport 20 may request the transportation of the users from the non-operable train. In this case, the information processing device 21 can designate the position of the stopped train as a departure place (second position) where the transportation is requested. The information processing device 21 estimates the number of users for each station as a destination from ticket information or the like and decides the number of transportation requesters.

In the above description, although the information processing device 21 decides the number of transportation requesters, the number of transportation requesters may be decided by a device other than the information processing device 21. The information processing device 21 may be configured to receive an input of the number of transportation requesters calculated by another device. The person in charge of the public transport 20 may directly input the number of transportation requesters to the information processing device 21.

As shown in a flowchart of FIG. 7, the public transport 20 transmits a second request for requesting the dispatch of the vehicle 30 from the information processing device 21 to the transceiver 12 of the server 11 in order to secure means of transportation for the user having a ticket, such as a train ticket or a commutation ticket (Step S201). The second request includes the number of transportation requesters of each section with a plurality of stations or points as a departure place (second position) and a destination shown in FIG. 5 or 6, respectively.

In a case where the second request is received through the transceiver 12 (Step S202), the controller 13 of the server 11 searches for information of the registered vehicles 30 stored in the storage unit 14 based on the number of transportation requesters of each section. The server 11 decides candidates of a plurality of second vehicles from among the registered vehicles 30 to be dispatched to any of a plurality of second positions and the number of boarding requesters for each of the candidates of the second vehicles (Step S203). The controller 13 may decide the number of second vehicles with a margin in advance in the expectation that a part of the vehicles 30 receiving the second request rejects the request. The vehicle 30 to be dispatched is decided based on a current position, a destination, a predicted traveling route, and the number of transportable people of the registered vehicle 30, registered conditions, and the like.

The controller 13 of the server 11 transmits second vehicle dispatch request information to the driver terminal 31 of the decided vehicle 30 through the transceiver 12 (Step S204). The second vehicle dispatch request information includes positional information of a departure place (second position) to be a base of transportation among a plurality of second positions and the number of boarding requesters, and does not include user identification information of a specific user. The second vehicle dispatch request information may further include information regarding a destination or a transportation direction (a B station direction, an E station direction, or the like). In a case where the vehicle 30 is a general vehicle that goes in a specific direction, the server 11 transmits the second vehicle dispatch request information taking into consideration a traveling direction of the vehicle 30. For this reason, the second vehicle dispatch request information may not include information regarding the destination or the transportation direction.

In a case where the second vehicle dispatch request information is received (Step S205), the driver terminal 31 displays, on the touch panel of the input/output device 35, the effect that the dispatch request is received and the detail of the received second vehicle dispatch request information (Step S206).

The driver terminal 31 displays a screen for requesting the driver to answer whether to accept or reject the dispatch request of the vehicle 30. The driver terminal 31 receives information (acceptance and rejection information) regarding acceptance or rejection from the driver and transmits the received information to the transceiver 12 of the server 11 (Step S207).

The controller 13 of the server 11 receives the acceptance and rejection information through the transceiver 12 (Step S208). The controller 13 determines whether or not the vehicles 30 corresponding to the number of people needed for the number of transportation requesters can be secured based on the information regarding acceptance or rejection of the dispatch request of the vehicle 30 included in the acceptance and rejection information received from the driver terminals 31 of the vehicles 30 (Step S209). In a case where the number of needed vehicles cannot be secured, the process is returned to Step S203, and other candidates of the vehicles 30 (second vehicles) are decided from the registered vehicles 30. Hereinafter, the processing of Step S203 to S209 is repeated between the server 11 and the driver terminal 31 as described above until the vehicles 30 (second vehicles) corresponding to the number of needed vehicles are secured.

In a case where acceptance is obtained from the vehicles 30 corresponding to the number of needed vehicles and the vehicles 30 corresponding to the number of needed vehicles can be secured (Step S209: Yes), the controller 13 does not transmit the second vehicle dispatch request information to any more vehicles 30. Though not shown in the flowchart of FIG. 7, the controller 13 of the server 11 may transmit a message reporting to the information processing device 21 of the public transport 20 that the vehicles 30 can be secured when the vehicles 30 corresponding to the number of needed vehicles can be secured.

As described above, in Steps S201 to S209, in the vehicle dispatch system 1, the processing in which the server 11 secures the vehicle 30 to be dispatched based on the request from the public transport 20 is included. Between the steps or after the steps, in Step S207, the vehicle 30 that accepts the dispatch goes toward the second position, such as a station, designated by the positional information and transports the user of the non-operable public transport 20 to the designated destination.

Steps S210 to S213 are related to a report of boarding records of the vehicle 30 and payment of compensation. It should be noted that the report of the boarding records of the vehicle 30 and the payment of the compensation may be performed by other methods. Accordingly, Steps S210 to S213 may not be included in the vehicle dispatch system 1.

During the transportation of the user of the public transport 20 or after transportation, the driver terminal 31 receives an input of boarding records of the transported user of the public transport 20 (Step S210). Specifically, the driver terminal 31 reads information regarding the effective date and time and the effective section of the ticket as the second information from the ticket of the user of the public transport 20 with the reading device 36. The driver terminal 31 confirms that the user is a regular user of the public transport 20 who uses the non-operable section based on the second information. In addition, the driver terminal 31 stores the number of times of boarding of the users having effective tickets and transportation sections. In a case where the driver terminal 31 does not include the reading device 36, the driver of the vehicle 30 may store the number of boarded users and the transportation sections using the driver terminal 31.

The driver terminal 31 generates information (third information) regarding the number of transported users and start points and the end points of transportation based on the request from the server 11 and transmits the generated third information as boarding records to the server 11 (Step S211). The driver terminal 31 can report the boarding records to the server 11 at any timing, such as each time there is an input of boarding of the user or after all of transportation end.

In a case where the report of the boarding records is received from each vehicle 30 through the transceiver 12 (Step S212), the controller 13 of the server 11 determines whether or not a requested number of users are transported based on the report of the boarding records. When determination is made that transportation of the requested number of users is completed, the controller 13 transmits, to the information processing device 21, a vehicle dispatch completion report to the effect that the dispatch of the vehicle 30 is completed (Step S213). The server 11 may compute the compensation to be paid to the driver of the vehicle 30 related to each driver terminal 31 based on the third information received from each vehicle 30. The vehicle dispatch completion report may include information regarding the total of compensation to be paid to the driver of the vehicle 30. Information regarding the total of compensation to be paid to the driver of the vehicle 30 may be transmitted to the public transport 20 later separately from the vehicle dispatch completion report.

The information processing device 21 receives the vehicle dispatch completion report from the server 11 (Step S214), and ends the processing.

As described above, with the vehicle dispatch system 1 of the embodiment, in addition to receiving the request (first request) from the user, such as an individual, and dispatching the vehicle 30 capable of ride-sharing, it is possible to dispatch the vehicle 30 based on the request (second request) from the public transport 20. In the latter case, when a railroad or the like that is managed by the public transport 20 is non-operable, the public transport 20 can secure alternative means of transportation for transporting the user who uses the public transport 20. With this, it is possible to improve the convenience of the user of the public transport 20, and to allow the public transport 20 to fulfill transportation duty for the user. Furthermore, it is possible to provide alternative means of transportation even for a user who cannot apply for a vehicle dispatch service since the user does not carry a smartphone, or the like.

It should be noted that the disclosure is not limited solely to the above-described embodiment, and many modifications or alterations may be made. For example, the functions and the like included in respective means or respective steps can be rearranged as long as there is no logical contradiction, and two or more means or steps may be combined into single means or step or may be divided.

What is clamed is:

1. A vehicle dispatch system comprising:
   an information processing device provided in a public transport;
   a server configured to manage a service for dispatching a vehicle; and
   a plurality of driver terminals configured to be browsed and operated by respective drivers of a plurality of registered vehicles, wherein
   the information processing device is configured to:
      acquire first information relating to issued tickets in the public transport, and
      calculate a number of transportation requesters of sections of the public transport based on the first information,
   each of the plurality of driver terminals includes:
      a position detection device configured to determine a current position of a respective registered vehicle based upon signals received from satellites, and
      a reading device configured to read information of the issued tickets by a magnetic reading or short-distance communication, and
   the server is configured to:
      receive a first request from a user terminal of a user who desires to board the vehicle and a second request from the information processing device, the first request including positional information of a first position where the user desires boarding and identification information of the user, and the second request including a number of transportation requesters of a plurality of the sections respectively connecting second positions as departure places and destinations,
      when the first request is received from the user terminal:
         decide candidates of one or more first vehicles to be dispatched to the first position from among the registered vehicles based upon the current positions, and
         transmit first vehicle dispatch request information, including the positional information of the first position and the identification information, to the driver terminals of the decided candidates of the first vehicles, and
      when the second request is received from the information processing device:
         decide candidates of a plurality of second vehicles each to be dispatched to any of the second positions from among the registered vehicles and a number of boarding requesters of each of the candidates of the second vehicles based on the number of transportation requesters of each of the plurality of the sections and the current positions, and
         transmit second vehicle dispatch request information, including positional information of any of the second positions and the number of boarding requesters and not including identification information of a specific user, to the driver terminals of the decided candidates of the second vehicles.

2. The vehicle dispatch system according to claim 1, wherein:
   each of the driver terminals includes the reading device configured to read second information from a ticket of the public transport, and
   each of the driver terminals is configured to, after the second request is received, identify a regular user of the public transport based on the second information read by the reading device.

3. The vehicle dispatch system according to claim 1, wherein:
   each of the driver terminals is configured to, after the second request is received:
      generate third information including a number of people transported by the vehicle related to the respective driver terminal and points of start and end of transportation, and
      transmit the generated third information to the server; and
   the server is configured to compute compensation to the driver related to the respective driver terminal based on the third information.

4. The vehicle dispatch system according to claim 1, wherein the server is configured to:
   receive acceptance and rejection information from the driver terminals of the decided candidates of the second vehicles, and
   determine whether or not a number of the second vehicles corresponding to the number of transportation requesters can be secured based the acceptance and rejection information.

5. The vehicle dispatch system according to claim 4, wherein the server is configured to:
   in a case where the number second vehicles cannot be secured, decide other candidates of the plurality of second vehicles from among the registered vehicles; and
   in a case where the number second vehicles can be secured not transmit the second vehicle dispatch request information to any more vehicles.

6. A server that manages a service for dispatching a vehicle and performs communication with an information processing device provided in a public transport and a plurality of driver terminals configured to be browsed and operated by respective drivers of a plurality of registered vehicles where each of the plurality of driver terminals includes a position detection device and a reading device, the server comprising:
a transceiver; and
a processor, wherein:
the transceiver is configured to receive a first request from a user terminal of a user who desires to board the vehicle and a second request from the information processing device, the first request including positional information of a first position where the user desires boarding and identification information of the user, and the second request including a number of transportation requesters of a plurality of sections of the public transport respectively connecting second positions as departure places and destinations;
the processor is configured to, when the first request is received from the user terminal:
decide candidates of one or more first vehicles to be dispatched to the first position from among the registered vehicles based upon current positions of the registered vehicles determined by the position detection devices based upon signal received from satellites, and
generate first vehicle dispatch request information including the positional information of the first position and the identification information;
the processor is configured to, when the second request is received from the information processing device:
decide candidates of a plurality of second vehicles each to be dispatched to any of the second positions from among the registered vehicles and a number of boarding requesters of each of the candidates of the second vehicles based on the number of transportation requesters of each of the plurality of sections and the current positions, and
generate second vehicle dispatch request information including positional information of any of the second positions and the number of boarding requesters and not including identification information of a specific user;
the transceiver is configured to:
when the processor generates the first vehicle dispatch request information, transmit the first vehicle dispatch request information to the driver terminals of the candidates of the first vehicles, and
when the processor generates the second vehicle dispatch request information, transmit the second vehicle dispatch request information to the driver terminals of the candidates of the second vehicles;
the number of transportation requesters of each of the plurality of sections of the public transport is calculated by the information processing device based upon first information relating to issued tickets in the public transport; and the reading devices are configured to read information of the issued tickets by a magnetic reading or short-distance communication.

7. An information processing method for a server of a vehicle dispatch system including an information processing device provided in a public transport, the server configured to manage a service for dispatching a vehicle, and a plurality of driver terminals configured to be browsed and operated by respective drivers of a plurality of registered vehicles where each of the plurality of driver terminals includes a position detection device and a reading device, the information processing method comprising:
receiving a first request from a user terminal of a user who desires to board the vehicle and a second request from the information processing device, the first request including positional information of a first position where the user desires boarding and identification information of the user, and the second request including a number of transportation requesters of a plurality of sections of the public transport respectively connecting second positions as departure places and destinations;
when the first request is received from the user terminal:
deciding candidates of one or more first vehicles to be dispatched to the first position from among the registered vehicles based upon current positions of the registered vehicles determined by the position detection devices based upon signal received from satellites, and
transmitting first vehicle dispatch request information including the positional information of the first position and the identification information to the driver terminals of the decided candidates of the first vehicles; and
when the second request is received from the information processing device:
deciding candidates of a plurality of second vehicles each to be dispatched to any of the second positions from among the registered vehicles and a number of boarding requesters of each of the candidates of the second vehicles based on the number of transportation requesters of each of the plurality of sections and the current positions, and
transmitting second vehicle dispatch request information including positional information of any of the second positions and the number of boarding requesters and not including identification information of a specific user to the driver terminals of the decided candidates of the second vehicles,
wherein the number of transportation requesters of each of the plurality of sections of the public transport is calculated by the information processing device based upon first information relating to issued tickets in the public transport, and
wherein the reading devices are configured to read information of the issued tickets by a magnetic reading or short-distance communication.

* * * * *